US006406734B1

(12) United States Patent
Albanese et al.

(10) Patent No.: US 6,406,734 B1
(45) Date of Patent: Jun. 18, 2002

(54) METHOD FOR IMPARTING A FRIED ONION AROMA TO FOODSTUFFS

(75) Inventors: Guido Pierre Albanese, Ansbach (DE); Leendert Nicolaas Fontijne, Vlaardingen (NL)

(73) Assignee: Lipton division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/533,055

(22) Filed: Mar. 23, 2000

(30) Foreign Application Priority Data

Mar. 26, 1999 (EP) .............................. 99200944

(51) Int. Cl.$^7$ ................................ A23L 1/222
(52) U.S. Cl. ...................... 426/535; 426/589; 426/615; 426/638; 426/640; 426/650
(58) Field of Search ................ 426/535, 615, 426/640, 638, 650, 589

(56) References Cited

U.S. PATENT DOCUMENTS

| | | | |
|---|---|---|---|
| 3,686,324 A | | 8/1972 | Brodnitz et al. |
| 4,020,170 A | * | 4/1977 | van den Ouweland |
| 4,080,367 A | * | 3/1978 | van den Ouweland |
| 4,119,737 A | * | 10/1978 | van den Bosch |
| 4,134,901 A | * | 1/1979 | van den Ouweland |
| 4,380,655 A | * | 4/1983 | van den Bosch |
| 4,477,678 A | * | 10/1984 | van den Bosch |
| 4,515,968 A | | 5/1985 | Pittet et al. |
| 5,320,862 A | | 6/1994 | La Tona |

FOREIGN PATENT DOCUMENTS

EP 1038450 * 8/2000

OTHER PUBLICATIONS

Nishimura 1971 Volatile Flavor Components of Caucas J. Agr. Food Chem 19(5) 992–994.*
Albrand 1980 Identification of a New Volatile Compound in Onion J. Agr. Food Chem 28:1037–1038.*
Block 1993 Allum Chemistry: Syntheses of Ak(en) yl 3, 4–Dimethyl–2 thienyl disulfides J. Agr. Food Chem 41(12) 2235–2237.*
Block, E., "The Organosulfur Chemistry of the Genus Allium—Implications for the Organic Chemistry of Sulfur", Angew. Chem. Int. Ed. Engl., (1992), 31, 1135–1178.
Block, Eric et al., "Allium chemistry: Synthesis and Sigmatropic Rearrangements from Cut Onion and Garlic", J. Am. Chem. Soc. (1996) 118(12), 2799–2810.
Block, Eric et al.: "Onion Essential Oil Chemistry, Cis–and trans–2–mercapto–3,4–dimethyl–2,dihydrothiophene from pyrolysis of bis(1–propenyl) disulfide" Tetrahedron Lett. (1990), 31(35), 4999–5002.
Block Eric et al., "Facts and Artifacts in Allium Chemistry", Sulfur Compounds in Foods, (1994), pp. 63–79.
Kuo, May–Chien et al.: "Volatile constituents of the distilled oils of Welsh onions (Allium fistulosum L. variety maichuon) and scallions (Allium fistulosum L. variety caespitosum)", J. Agric. Food Chem. (1992), 40(1), 111–117.

* cited by examiner

Primary Examiner—Carolyn Paden
(74) Attorney, Agent, or Firm—Gerard J. McGowan, Jr.

(57) ABSTRACT

A method for imparting a fried onion aroma and/or odor to a foodstuff, wherein cis/trans-3,4-dimethyl-2-mercapto-2,3-dihydrothiophene (DMMT) is added to said foodstuff, with the proviso that this is not achieved by adding species of plants or (processed) parts thereof belonging to the genus of Allium.

26 Claims, 1 Drawing Sheet

METHOD FOR IMPARTING A FRIED ONION AROMA TO FOODSTUFFS

FIELD OF THE INVENTION

Figure 1:
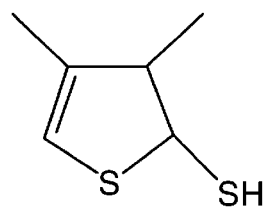

The present invention relates to a method for imparting an aroma to foodstuffs, which aroma is generally associated with (freshly) fried onion and similar species.

BACKGROUND OF THE INVENTION

Onions and other members (e.g. garlic, leek, shallots, chives, etcetera) of the botanical genus of Allium are well known ingredients in dishes around the world. These ingredients are capable of imparting a distinct taste and aroma to foodstuffs. When freshly preparing foodstuffs in which the aroma and taste of onions is desired, this will generally involve cutting or chopping onions which are then fried or sauteed for several minutes, usually in oil or butter. In particular the taste and aroma of freshly fried or sauteed onions is liked in e.g. soups and sauces.

In the ever increasing range of convenience food, which is partly or fully cooked, the taste and aroma of fried onions is in many cases a desired attribute. The industrial manufacturer may achieve this by incorporating fried onions in the foodstuff at some stage in the industrial process. Such fried onions may be either freshly prepared, dried or frozen or otherwise processed. Although this may provide acceptable results with respect to taste, the general experience is that a so-prepared foodstuff will in most cases lack the agreeable aroma of freshly fried or sauteed onions, which the housewife will perceive when freshly preparing a dish with onions which are fried or sauteed during the preparation of the dish.

When incorporating fried onions (whether it be dried, frozen, or freshly prepared and further processed for obtaining keepability) in a fully or partly prepared foodstuff, the distinct aroma of fried onions is apparently lost at some stage during processing to such an extent that when the consumer opens the packaging of said foodstuff and heats or finishes the preparation prior to consumption, there is little to no aroma perceived of fried onions.

Although the taste may be improved by incorporating in said foodstuffs a "fried onion" flavour as supplied by various flavour manufacturers, the results in terms of fried onion aroma are still disappointing in many respects.

Various references in the past have attempted to shed some light on the complex chemistry and composition of fried onion flavour. Among such references are: E. Block, Angew. Chem. Int. Engl., 31, 1135–1178 (1992), E. Block and S. H. Zhao, Tetrahedron Letters, 31(35), 4999–5002 (1990), E. Block and E. M. Calvey, Sulfur Compounds in Foods, 63–79 (1994).

SUMMARY OF THE INVENTION

Following the above, there is a need for a convenient method for imparting a (fresh) fried onion aroma or odour to a foodstuff. Preferably, this objective should be achieved for (but not limited to) pre-processed foodstuffs such as convenience food, which only needs to be heated (with or without the addition of water) by the consumer. Examples of such foodstuffs are e.g. soup- and sauce base products (for example in dry form).

It has now been found that the above may be achieved by a method for imparting a (fried) onion aroma and/or odour to a foodstuff, wherein cis/trans-3,4-dimethyl-2-mercapto-2,3-dihydrothiophene (DMMT) is added to said foodstuff, with the proviso that this is not achieved by adding species of plants or (processed) parts thereof belonging to the genus of Allium. Preferably, DMMT is added to the foodstuff in an amount of 1 to 1000 ppm, more preferably 50 ppb to 50 ppm, preferably 250 ppb tp 5 ppm. For some purposes, an upper limit of 1000 ppb may be preferred.

Alternatively, DMMT may be applied next to the presence of plants or (processed) parts thereof belonging to the genus of Allium, in a method for imparting a (fried) onion aroma and/or odour to a foodstuff, wherein cis/trans-3,4-dimethyl-2-mercapto-2,3-dihydrothiophene (DMMT) is added to said foodstuff in an amount of at least 50 ppb, and less than 1000 ppm. For some purposes, depending e.g. upon the foodstuff to which DMMT is applied such amounts may be different, e.g. amounts of at least 150 ppb, preferably at least 250 ppb and less than 1000 ppm may be preferred.

DETAILED DESCRIPTION OF THE INVENTION

The compound cis/trans-3,4-dimethyl-2-mercapto-2,3-dihydrothiophene (DMMT) has a structure as is set out in FIG. 1.

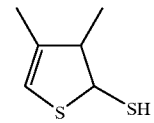

This compound is not present in raw onions, but is formed (together with an abundance of other odourants, flavourants, aroma- or taste compounds) by the subsequent action of cutting or comminuting onions, frying the so obtained pieces in fat or oil (or any alternative heat treatment in the presence of triglycerides like sauteeing, simmering or deep-frying). It is thought that both the cis and the trans-form of DMMT provide a fried onion aroma, although one may have a stronger effect than the other.

DMMT can be prepared according to the various references by E. Block, as reported herein.

Figure 2:
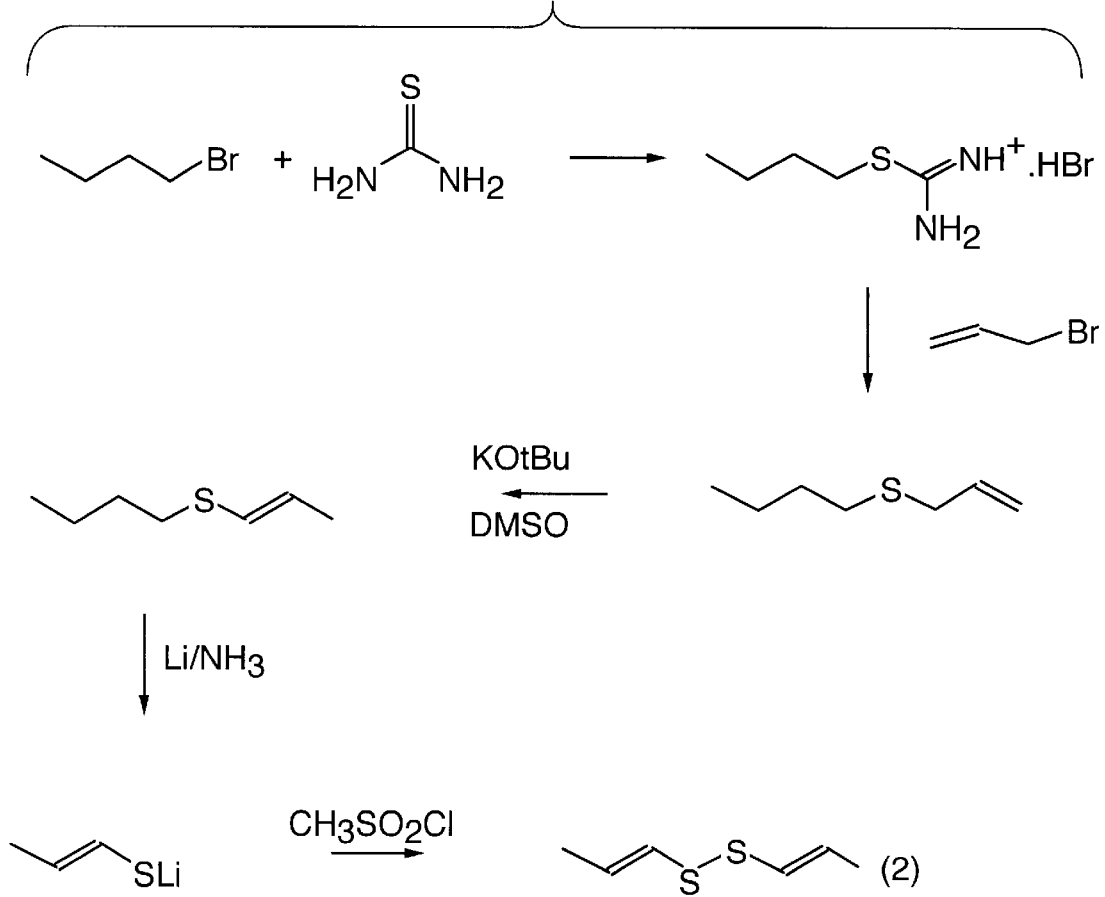

In an alternative way, instead of or in addition to adding DMMT to foodstuffs a precursor of DMMT may be added to the foodstuff, which precursor may be converted to DMMT e.g. upon the application of heat. Such a precursor is di(1-propenyl)disulfide (FIG. 2). This compound can be converted into DMMT easily by application of heat, typically 90–120° C.) for 1–15 minutes. Heating to perform such conversion is preferably carried out in oil, such as when frying meat, fish or vegetables.

Hence, the invention relates to a method for providing a foodstuff which, when heated, displays a (fried) onion aroma and/or odour, wherein di(1-propenyl)disulfide (DPDS) is added to said foodstuff, with the proviso that this is not achieved by adding species of plants or (processed) parts thereof belonging to the genus of Allium. DPDS is a precursor of DMMT, and can be converted in DMMT by applying suitable heat (e.g. conditions as are present when frying meat or vegetables). The amounts in which DPDS can suitably be applied are similar to that of DMMT. DPDS and DMMT may be applied in a composition jointly or separately.

Likewise, the invention further relates to a method for providing a foodstuff which, when heated, displays a (fried) onion aroma and/or odour, wherein di(1-propenyl)disulfide (DPDS) is added to said foodstuff in an amount of at least 50 ppb, preferably at least 250 ppb, and less than 1000 ppm.

The advantage of using the precursor is that some time and heat is needed to form most of the aroma. Especially when a combination of DMMT and the precursor is used in the preparation of a packed foodstuff, this may result in a packed foodstuff which liberates a fried onion aroma when the pack is opened (DMMT) and when the product is heated sufficiently, more DMMT is liberated as it is formed in situ following the conversion of the precursor (e.g. di(1-propenyl)disulfide) into DMMT. As the precursor is also present in the process of actually frying onions, no off-flavours or other disturbing components are introduced.

As DMMT is not very stable in the presence of water, the method according to the invention is preferably applied to foodstuffs which have a low to very low water content ($a_w$ less than 0.7, preferably less than 0.5). Examples of such foodstuffs are dry mixes (e.g. packed in sachets) for preparing soup or sauce, which can be turned in a soup or sauce by administering water or other aqueous liquid and optionally applying heat. The threshold value and volatility of DMMT are such that when DMMT is incorporated by the manufacturer of a dry soup or sauce in the dry mix, the aroma of freshly fried onions is almost immediately noticed once the packaging (e.g. a sachet) is opened. This will contribute to a positive, freshness appeal of the foodproduct, which is of particular importance in the case of dry mixes for soups and sauces, e.g. tomato-based sauce and soup. The aroma will be noticeable until some time after opening the packaging (i.e. during preparation).

The water content in such compositions will usually be low ($a_w$ less than 0.7, preferably less than 0.5). Particulate composition having such water activities are preferred. A low level of water present will enhance stability of DMMT. However, application is not limited to dry foodstuffs. When a certain amount of water is present, measures will have to be taken to prevent DMMT from degrading. This can be done e.g. by encapsulating DMMT or by the addition of antioxidants.

The method according to the invention is preferably applied to foodstuffs which are ambient stable, or which are processed such that they become ambient stable. Examples of ambient stable foodstuffs to which the method according to the invention may be applied are e.g. frying oils, frying fats and mixtures of such oils and fats. Other foodstuffs include for example mixtures of oils and/or fats with herbs and/or spices added thereto, as become increasingly popular in e.g. stir-fry dishes. Usually, such mixtures have very limited amounst of water in them, which make them very suitable for addition of DMMT and/or DPDS according to the invention.

Suitable amounts for adding DMMT and di(1-propenyl)disulfide to the foodstuff are 1 to 1000 ppb, preferably 10–100 ppb, based on the total weight of the packed product.

The invention further relates to compositions obtained following the method(s) as set out above, such as edible compositions comprising at least 50 ppb, preferably at least 250 ppb and less than 1000 ppm, of di(1-propenyl) disulfide (DPDS), and/or at least 50 ppb, preferably at least 250 ppb, and less than 1000 ppm of cis/trans-3,4-dimethyl-2-mercapto-2,3-dihydrothiophene (DMMT). Such edible compositions may further comprise at least 20%, preferably at least 40% by weight of edible fat, oil, or mixtures thereof. Examples of such compositions are e.g. frying oil, frying fat, or mixture thereof, optionally further containing herbs and spices.

Alternatively, the composition as set out above is a soup or sauce base product, which may be turned into a soup or sauce by dillution with an aqueous liquid, optionally under the application of heat.

For some purposes, it may be desired to have DMMT and/or DPDS are present in the composition predominantly in an encapsulated form.

As the precursor of DMMT (i.e. di(1-propenyl)disulfide) is in good rates transferred into DMMT when frying in oil, the invention also extends to oil or fat containing at least 1 ppb of di(1-propenyl)disulfide, preferably at least 10 ppb, and less than 1000 ppm. Preferably, this is achieved in the absence of plants or (processed) parts thereof belonging to the genus of Allium.

The invention is further exemplified by the following examples, which are to be understood as to be non-limiting.

EXAMPLES

Synthesis of Di(1-propenyl)disulfide

Di(1-propenyl)disulfide (2) was synthesized according to the FIG. 2.

Butyl bromide (68 g, 0.5 mol) was reacted in 500 ml of ethanol with thiourea (38 g, 0.5 mol) by boiling for several hours. The solvent was removed by evaporation on a rotary evaporator and the resulting viscous product dissolved in a mixture of 300 ml of benzene and 300 ml of 30% NaOH soln. in water. 1 g of Tetrabutylammoniumbromide was added and 60 g of allylbromide (0.5 mol). The mixture was stirred for several hours and then separated. The benzene layer was dried and evaporated to leave butyl-allyl-sulfide in almost quantitative yield. The product was added in three equal portions to a solution of 2.5 g of KOtBu in 100 ml DMSO. After the addition the mixture was kept at 40–50° C. for 30 min. After cooling the mixture was poured into 300 ml ice water and extracted with pentane. The pentane layer was dried and evaporated to leave the butyl-propenyl-sulfide (46 g).

The compound, dissolved in ether, was slowly added to a soln. of 5 g Li in 300 ml $NH_3$. After the addition the $NH_3$ was removed (regularly some ether was added to keep the liquid level constant), the mixture was cooled to −70° C. and 81 g of methanesulfonyl chloride, dissolved in 250 ml ether was slowly added. When the addition was finished, the mixture was stirred at 5° C. for 1 h, quenched with water and extracted. The organic layer was washed with $NaHCO_3$ and dried. NMR of a sample showed the presence of some starting material.

A fraction (1 g) was purified by column chromatography, using pentane as eluent. The presence of the disulfide in the different column fractions could be detected by running the fractions on TLC, using pentane as eluent and subjecting the plates to UV light. The disulfide shows as a dark spot on the green background.

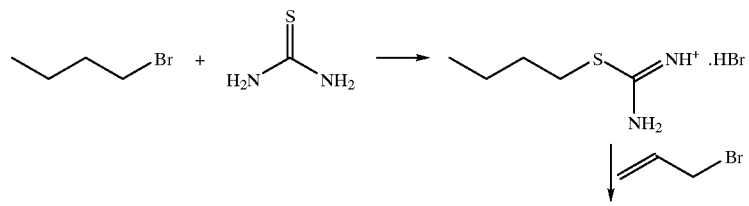

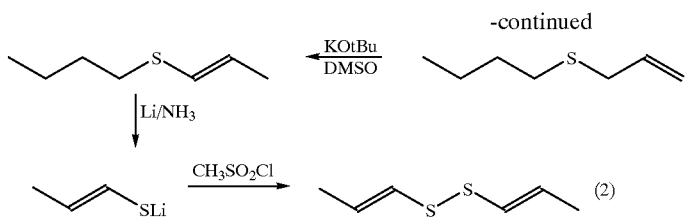

FIG. 2. Synthesis of Di(1-propenyl)disulfide

Thermolysis of Di(1-propenyl)disulfide to DMMT

In this experiment 10 mg Di(1-propenyl)disulfide was heated for 15 minutes in a closed micro-flask without solvent in the oil-bath at 90° C. After cooling 1 ml of ethanol was added. Of this solution 10 μl was taken into 2 ml ethanol used for organoleptical trials (after further dilution of 100 mg of this solution in 10 g MCT-oil).

Sensorical Assesment of DMMT—Pure Compound

The pure compound DMMT in ethanol was evaluated in a small expert panel (3 people) from sniffing strips. DMMT can be smelled after evaporation of the solvent on the sniffing strips. The resulting smell (after evaporation of the solvent and partial evaporation of the DMMT was described as: fried onion, meaty, sulphury.

Sensorical Assesment of DMMT—in Dry Mix Base Tomato Sauce

DMMT prepared as above was assesed in a simple, basic dry tomato sauce preparation, which is mixed with water just prior to evaluation.

A dry tomato base sauce preparation (powder) was prepared by mixing:

| | |
|---|---|
| Tomato powder (Transa CB 3500) | 91.5% |
| Sugar | 4.5% |
| Salt | 4.0% |
| Total | 100.0% |

To the base product DMMT was added in concentrations ranging from 32 to 2000 ppb.

To 164 g of the tomato base powder containing DMMT 834 g of boiling water was added and stirred. The sauce was smelled and tasted and monadically described (4 people). The results are set out in table 1.

TABLE 1 fried onion aroma by DMMT in tomato base sauce.

| Concentration DMMT (ppb) | description |
|---|---|
| 32 | weak onion aroma |
| 64 | fried onion aroma |
| 128 | fried onion aroma |
| 500 | strong onion aroma |
| 1000 | very strong onion aroma |
| 2000 | too strong aroma, unpleasant |

The sensorial description of DMMT as a pure compound at high concentrations was meaty/sulfury/onion and only at lower concentrations fried onion. The smell of the samples at blind testing evoked the association of fried onions and the taste rounded the acidic tomato taste off and smoothed the other flavours present. For application in tomato bases low concentrations ranging from 64 ppb to 1 ppm were found to be suitable for imparting a fried onion aroma to tomato base products.

Sensorical Analysis of Conversion of Di(1-propenyl)-disulfide to DMMT

In a 20 ml glass vial were added:
5 ml sunflower oil
1000 ppm di(1-propenyl)disulfide The vial was closed and heated to 90° C. for 5 minutes. After opening a fried onion aroma was clearly perceived.

What is claimed is:

1. Method for imparting a (fried) onion aroma and/or odour to a foodstuff, comprising adding cis/trans-3, 4diriethyl-2-mercapto-2,3-dihydrothiophene (DMMT) to said foodstuff, wherein the foodstuff has a water activity $a_w$ of less than 0.7 and with the proviso that the addition of DMMT is not achieved by adding species of plants or (processed) parts thereof belonging to the genus of Allium.

2. Method according to claim 1 comprising adding DMMT and/or DPDS in an amount of 1 ppb to 1000 ppm to the foodstuff.

3. Method according to claim 1 comprising adding DMMT and/or DPDS in an amount of 50 ppb to 50 ppm to the foodstuff.

4. Method according to claim 1, wherein the foodstuff is a frying oil, frying fat, or mixture thereof.

5. Method according to claim 1, wherein the foodstuff is a dry particulate composition.

6. Method according to claim 1, wherein the foodstuff is a soup or sauce base product.

7. Method according to claim 1, comprising incorporating jointly DMMT and DPDS in the foodstuff.

8. Method according to claim 1 wherein the foodstuff has a water activity $a_w$ of less than 0.5.

9. Method for providing a foodstuff which, when heated, displays a (fried) onion aroma and/or odour, comprising adding di(1-propenyl)disulfide (DPDS) to said foodstuff, with the proviso that the addition of DPDS is not achieved by adding species of plants or (processed) parts there belonging to the genus of Allium.

10. Method according to claim 9, wherein the foodstuff is processed such that it is ambient stable.

11. Method according to claim 9, wherein the foodstuff is a mixture of oils and/or fats with herbs and/or spices.

12. Method according to claim 9 comprising adding DMMT and/or DPDS in an amount of 1 ppb to 1000 ppm to the foodstuff.

13. Method according to claim 9 comprising adding DMMT and/or DPDS in an amount of 50 ppb to 50 ppm to the foodstuff.

14. Method according to claim 9, wherein the foodstuff is processed such that it is ambient stable.

15. Method according to claim 9, wherein the foodstuff is a mixture of oils and/or fats with herbs and/or spices.

16. Method according to claim 9, wherein the foodstuff is a frying oil, frying fat, or mixture thereof.

17. Method according to claim 9, wherein the foodstuff is a dry particulate composition.

18. Method according to claim 9, wherein the foodstuff is a soup or sauce base product.

19. Method according to claim 9, comprising incorporating jointly DMMT and DPDS in the foodstuff.

20. Method according to claim 9 wherein the foodstuff has a water activity $a_w$ of less than 0.5.

21. Edible composition comprising at least 50 ppb of di(1-propenyl)disulfide (DPDS), and/or at least 50 ppb and less than 1000 ppm of cis/trans-3,4-dimethyl-2-mercapto-2,3-dihydrothiophene (DMMT), based on the final food prior to consumption.

22. Composition according to claim 21, further comprising at least 20% by weight of edible fat, oil, or mixtures thereof.

23. Composition according to claim 21, in the form of a frying oil, frying fat, or mixture thereof, optionally further containing herbs and spices.

24. Composition according to claim 21, which composition is a soup or sauce base product.

25. Composition according to claim 21 in which DMMT and/or DPDS are present in the composition predominantly in an encapsulated form.

26. Method for imparting a (fried) onion aroma and/or odour to a foodstuff, comprising adding cis/trans-3,4-dimethyl-2-mercapto-2,3-dihydrothiophene (DMMT) and/or di(1-propenyl)disulfide (DPDS) in encapsulated form to said foodstuff.

* * * * *